United States Patent [19]
Kleen et al.

[11] 3,891,863
[45] June 24, 1975

[54] VOLTAGE TRANSFORMER FOR A FLUID INSULATED HIGH-VOLTAGE MULTI-CONDUCTOR SWITCHING APPARATUS

[75] Inventors: Gerhard Kleen; Albert Herrmann, both of Berlin, Germany

[73] Assignee: Siemens Aktiengesellschaft, Munich, Germany

[22] Filed: May 17, 1974

[21] Appl. No.: 470,906

[30] Foreign Application Priority Data
May 17, 1973 Germany............................ 2325446

[52] U.S. Cl. ................ 307/147; 307/149; 336/174; 336/175
[51] Int. Cl...... H01f 40/08; H01f 40/10; H01b 9/06
[58] Field of Search .......... 307/147, 149; 324;127/; 336/173, 174, 175

[56] References Cited
UNITED STATES PATENTS
| 1,873,977 | 8/1932 | Naef............................ 174/DIG. 10 |
| 3,577,110 | 5/1971 | Arntz et al....................... 336/175 |

FOREIGN PATENTS OR APPLICATIONS
259,231 8/1927 United Kingdom.......... 174/DIG. 10

*Primary Examiner*—L. T. Hix
*Attorney, Agent, or Firm*—Kenyon & Kenyon Reilly Carr & Chapin

[57] ABSTRACT

An improved voltage transformer for a fluid insulated, high-voltage multi-conductor switching apparatus of the type including a metallic outer casing. A plurality of electrical insulation members are disposed about the conductors and include an electrode, which may consist of a coating of electrically conductive material, disposed on the surface thereof. A centering member is disposed between the insulation members in engagement therewith for positioning the members in a predetermined position relative to the conductors. The members are secured in this predetermined position by adjustable straps disposed about the insulation members and centering member, and suitable fastening means are provided for attaching the insulation members in their secured position to the casing of the apparatus.

15 Claims, 7 Drawing Figures

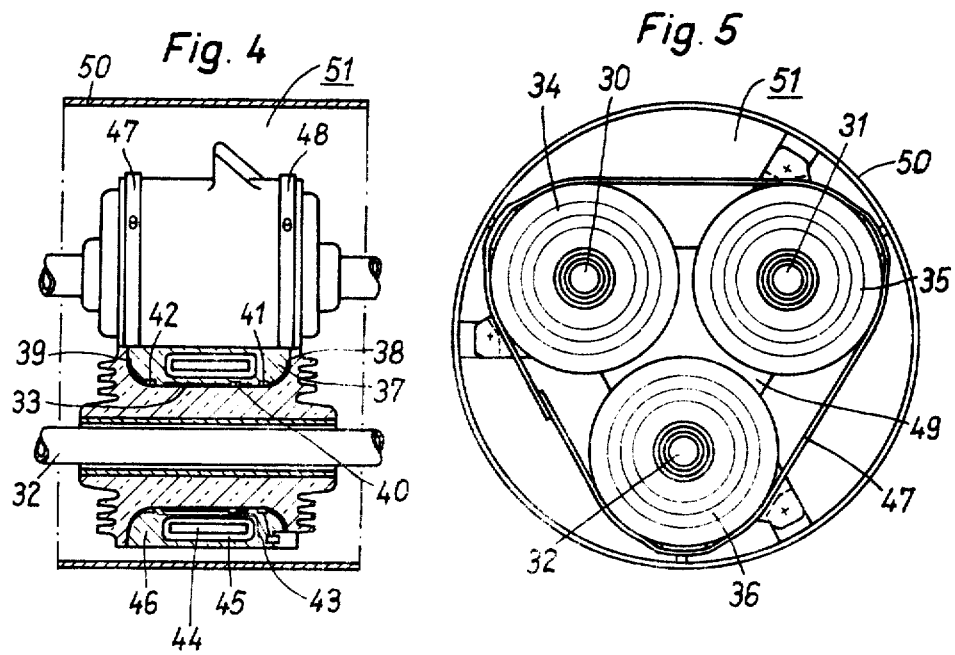

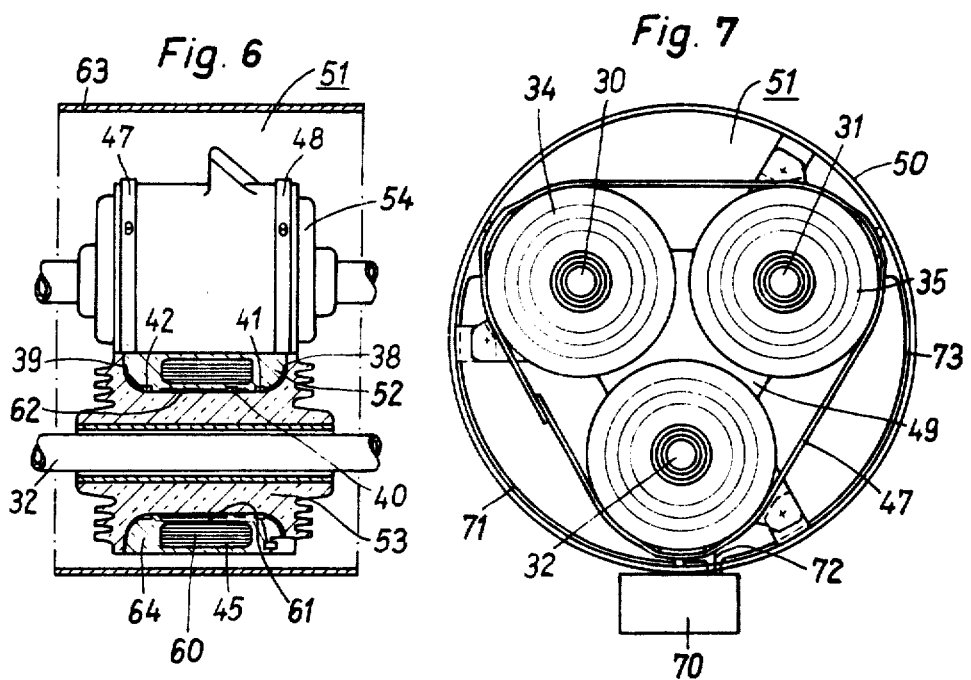

VOLTAGE TRANSFORMER FOR A FLUID INSULATED HIGH-VOLTAGE MULTI-CONDUCTOR SWITCHING APPARATUS

BACKGROUND OF THE INVENTION

This invention relates to an improved voltage transformer for a fluid, i.e., gas or liquid, electrically insulated high-voltage switching apparatus which is encapsulated by a metal casing and includes a plurality of electrical conductors. Such voltage transformers are known in the prior art. See, for example, German Offenlegungsschrift No. 2,125,297, which teaches a surface electrode disposed within a metallic tubular casing of a high-voltage switching apparatus. This surface electrode, and the high-voltage conductor of the apparatus, together form the high-potential capacitor of a voltage divider comprising a low-potential capacitor and the high-potential capacitor. An amplifier coupled to a load is connected to the low-potential capacitor. Such a voltage transformer is suitable only for use in those high-voltage switching systems which carry only one high-voltage electrical conductor within the metal casing thereof.

It is also generally known in the art (see, for example, Smit-Mededelingen, 24 (1964) No. 4, pages 223 to 232) to perform voltage measurements by means of a device which is mounted on the outside surface of the metal casing of the switching apparatus. Such devices usually include a rod type conductor coupled to the high-voltage electrical conductor of the apparatus which forms one high-voltage electrode of a high-potential capacitor which is part of a capacitive divider. A measuring electrode forms the other electrode of the high-potential capacitor and consists of a cylindrical shaped electrode disposed about the rod type conductor within the voltage measurement device. This measuring electrode is coupled to a capacitor which comprises the low-potential capacitor of the voltage divider. An amplifier, the resistance of which forms the load of the voltage transformer and which may comprise a measuring instrument or a system protection device, is coupled to the low-potential capacitor.

The use of such prior art voltage transformers in a high-voltage switching apparatus carrying several electrical conductors involves considerable expense since a separate external voltage measurement device must be provided for measuring the voltage at each electrical conductor. The provision of such devices also requires much additional space within the switching apparatus, which is an undesirable feature.

SUMMARY OF THE INVENTION

It is therefore an object of the invention to overcome the aforementioned disadvantages of prior art devices and to provide an improved voltage transformer for a multi-conductor, fluid insulated, high-voltage switching apparatus.

These and other objects are achieved by the provision of a plurality of electrical insulation members which are disposed about the electrical conductors of the apparatus, each of which have an electrode disposed on the surface thereof. A centering member is disposed between the insulation members in engagement therewith, and positions the members in a predetermined position relative to the conductors. Means, disposed about the electrical insulation members and the centering members, secures the electrical insulation members in the described predetermined position, and additional means fastens the electrical insulation members in their fixed position to the metal casing of the switching apparatus.

It is a significant advantage of the inventive voltage transformer arrangement that no additional space is required to accommodate the electrodes necessary for forming the high-potential capacitor of each capacitive divider since they are disposed within the apparatus casing. A further advantage of the inventive voltage transformer is that it is cost effective, since the external attachments to the metal casing are avoided, and rod type conductors for forming the high-voltage electrode of the high-potential capacitor are not required. (The high-voltage electrode of the high-potential capacitor is formed by each individual conductor in the inventive voltage transformer arrangement.) Moreover, the inventive voltage transformer is lighter in weight due to the elimination of external attachments and thus can be transported more easily. The centering member utilized has the additional advantage that additional inserts may be provided, if required, between the centering member and the electrical insulation members in order to compensate for tolerances between the electrical conductors and the electrical insulation members. This permits the formation of high-potential capacitors of approximately the same capacitance and improves the instrumental evaluation of the measured voltages.

The fastening means used to secure the insulation members to the apparatus casing may comprise adjustable straps disposed thereabout, and mounting bosses on the members which are coupled to the apparatus casing by means of suitable fastening elements. In some situations it may be desirable to provide tabs bent out of the straps for attachment to the fastening elements of the casing in lieu of the mounting bosses.

The straps utilized preferably include threaded sleeves in which adjustable screws are disposed for engaging the electrical insulation members and tensioning the straps. This arrangement facilitates the installation of the members and permits a high tensioning force to be exerted.

The surface electrode of the voltage transformer may be of any suitable design. It may, for instance, comprise sheet metal. However, it is preferable to form the electrode by means of a conductive coating on the electrical insulation members. Also, although the design of the insulation members may vary, it is preferable that the insulation members are annular in shape and surround the electrical conductors of the apparatus, and further, are spaced apart from the conductors by a definite, uniform distance, so that the dielectric of the high-potential capacitors formed by the electrical conductors and the surface electrodes is formed by the fluid insulation of the switching apparatus. In such an arrangement, each insulation member carriers the surface electrode on its radially inner peripheral surface which faces the electrical conductor. Alternatively, it is also preferable if the dielectric of the high-potential capacitors formed by the electrical conductors and the surface electrodes is formed by the insulation members, with the surface electrodes being disposed on the outer peripheral surface of each member.

The electrical insulation members also preferably include constricted areas at the outer periphery thereof in which the surface electrodes are disposed. Such constricted areas can be utilized not only for carrying the surface electrodes in a manner which is favorable from an electrical insulation point of view, but moreover, can also be used to accommodate the low-potential capacitor of the capacitive divider. This has the distinct advantage of assuring that the low-potential capacitor is subjected to the same temperature as the high-potential capacitor, so that, if dielectrics are chosen which have a favorable temperature characteristic, equal capacitance variations of the high and low-potential capacitors in response to temperature changes is produced. The effect of temperature variation on the division ratio of the capacitive divider, and, consequently, on the voltage measurement result, is thus largely eliminated. If the electrical insulation members are, for example, made of cast resin, and if a capacitor is used as the low-potential capacitor which likewise contains cast resin as the dielectric, the division ratio of the divider will not change at all in response to temperature variations. The constricted areas of the insulation members can, alternatively, be used to accommodate a current transformer core which includes a secondary winding system.

If electrical insulation members having a constricted area are used, the low-potential capacitor can, of course, be disposed outside the metal casing of the apparatus, and merely the current transformer core and secondary winding disposed within the constricted area. In either case, it is preferable to fill the constricted areas of the members with casting resin in order to provide a protective covering and secure the components in the constricted areas.

The surface electrodes of the transformer are preferably formed by cylindrical electrodes which in conjunction with the electrical conductors of the switching apparatus, form a cylindrical capacitor. This is known per se from German Offenlegungsschrift No. 1,125,297. It is also preferable to dispose guard ring electrodes on both sides of such a cylindrical electrode, as described in German Offenlegungsschrift No. 2,125,297.

BRIEF DESCRIPTION OF THE DRAWINGS

FIG. 4 is a side view, partly in section, of another embodiment of a voltage transformer constructed according to the invention;

FIG. 5 is a front end view of the transformer of FIG. 4;

FIG. 6 is a side view, partly in section, of a further embodiment of a voltage transformer constructed according to the invention; and FIG. 7 is a front end view of still a further embodiment of a voltage transformer constructed according to the invention.

DETAILED DESCRIPTION

Figure 1:
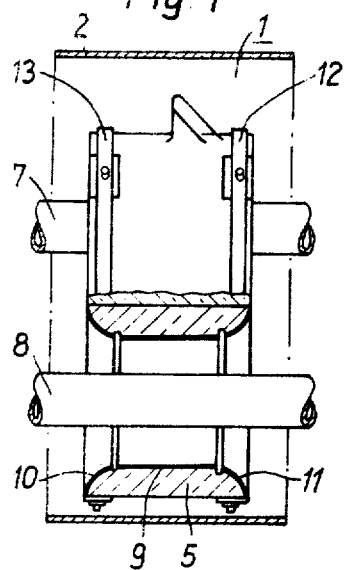
FIG. 1 is a side view, partly in section, of an improved voltage transformer constructed according to the invention.
Figure 2:
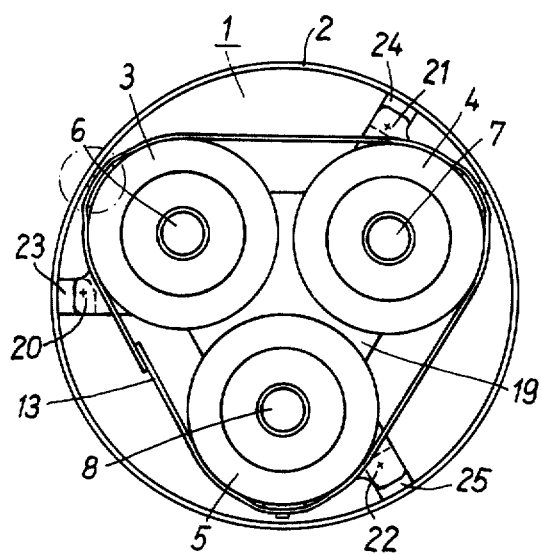
FIG. 2 is a front end view of the transformer of FIG. 1.

Referring now to the drawings, and in particular to FIGS. 1 and 2, there is shown a voltage transformer for a gas or liquid insulated, high-voltage switching apparatus 1 which includes a metal casing 2 and three electrical conductors 6, 7 and 8. The voltage transformer of the invention comprises a plurality of annular shaped electrical insulation members 3, 4 and 5 which carry on their radially inner surfaces adjacent the conductors 6, 7 and 8, a plurality of surface-type electrodes 9, illustrated in the drawings as a plurality of electrically conductive coatings applied to members 3, 4 and 5. Guard ring electrodes are disposed at both ends of each electrode 9 and are electrically insulated from the electrodes.

Figure 3:
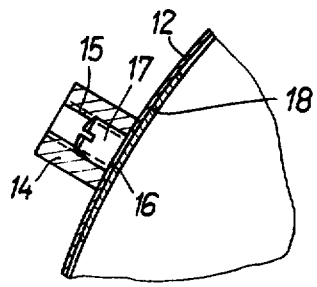
FIG. 3 is a partial sectional view of the fastening straps of the transformer.

The insulation members are strapped together by means of a pair of straps 12 and 13. As shown in FIG. 3, threaded sleeves 14, which include a threaded bore 15, are welded to straps 12 and 13 to enable tensioning of the straps about members 3–5. Each of the straps also includes an aperture 16 which is aligned with bore 15 in sleeves 14. A screw 17 is disposed in bore 15 and engages a plate 18 disposed on each of the insulation members to lift the straps away from the insulation members. The insulator members are held in fixed positions relative to each other by means of a centering member 19. If desired or necessary, this fixed position can be further varied by utilizing shims in order to assure that the insulation members are disposed in concentric positions relative to conductors 6–8. The members are fastened by a plurality of mounting bosses 20, 21 and 22 to a plurality of fastening members 23, 24 and 25 attached to casing 2. In the illustrated embodiment of the invention, the fastening means comprise angular mounting brackets. The above arrangement assures that the insulation members of the voltage transformer are disposed in a fixed position relative to each other concentrically with respect to the individual electrical conductors and are restrained from axial displacement. A capacitive divider including high potential capacitors is formed by electrical conductors 6–8 and electrodes 9. The low-potential capacitors required to form the capacitive divider, and the amplifier which is generally connected to these capacitors, are not illustrated in the drawings for the purposes of clarity. Such a low-potential capacitor and amplifier arrangement is described in detail in German Offenlegungsschrift No. 2,125,297.

Another embodiment of the voltage transformer is shown in FIGS. 4 and 5. This embodiment differs from the previously described arrangement in that insulation members 34, 35 and 36 serve as the dielectric of high-potential capacitors formed by high-voltage electrical conductors 30, 31 and 32 and surface-type electrodes 33 disposed on the insulation members. As shown in FIG. 4, the members carry electrodes 33 on the outer periphery thereof facing away from electrical conductors 30 – 32. Electrodes 33 are disposed in constricted areas 37 provided in the insulation members, in which constricted areas guard ring electrodes 38 and 39 are disposed. Electrodes 38 and 39 are electrically insulated from electrodes 33. Electrodes 33 also include a contact ring 40, and similarly, guard ring electrodes 38 and 39 also have contact rings 41 and 42. Contact ring 40 is coupled by a transmission line 43 to a low-potential capacitor (not shown). Contact rings 41 and 42 are also coupled to a transmission line which is connected to ground potential.

A current transformer core 44 including a secondary winding system 45 is disposed within areas 37 of the insulation members and is covered by casting resin 46 which fills the constricted area to electrically insulate the current transformer and secure it in position. In addition to the current transformer core, or in place thereof, a circularly wound capacitor may be provided, also in the constricted area of each insulation member. These circularly wound capacitors function as the low-potential capacitors for the high-potential capacitors formed by the surface electrodes and electrical conductors. This arrangement is advantageous in that the low-potential capacitor is subjected to the same temperature conditions as the high-potential capacitor, and consequently the dielectrics of both capacitors are subjected to the same change in temperature. Moreover, if the temperature characteristic of both capacitor dielectrics is the same, the divider ratio remains constant and is not affected by temperature variations. Insulation members 34–36 are strapped together in the same manner as the members shown in FIGS. 1 and 2, namely, by means of straps 47 and 48, a centering piece 49, and the mounting bosses and fastening members already described.

Another embodiment of the inventive voltage transformer is shown in FIG. 6 and differs from that described in FIGS. 4 and 5 in that a circularly wound capacitor 60 is disposed in the constricted area 52 of the insulation members 53 and 54. Capacitor 60 is coupled to surface-type electrode 62 by means of a transmission line 61, and is coupled to ground potential outside metal casing 63 by a transmission line (not shown). Capacitor 60 is also covered with a casting resin 64. The remaining features of this embodiment of the invention are the same as those shown in FIG. 4 and are consequently not discussed again herein.

FIG. 7 illustrates another embodiment of the inventive voltage transformer which is similar to that shown in FIGS. 1 and 2. In this embodiment low-potential capacitors are disposed outside the metal casing 2 in a box 70 and are coupled to the high-potential capacitors by means of transmission lines 71, 72 and 73 in order to form voltage dividers. Lines 71–73 are coupled to electrodes 9. This described mounting of the container 70 containing the low-potential capacitors on metal casing 2 assures that the low-potential capacitors are always at approximately the same temperature as the metal casing. This effect causes the division ratio of the capacitive voltage dividers to remain constant during temperature changes.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An improved voltage transformer for a fluid insulated high-voltage multi-conductor switching apparatus, which includes a metal casing, comprising:

a plurality of electrical insulation members disposed about the conductors and each having an electrode disposed on the surface thereof;

a centering member, disposed between said insulation members and in engagement therewith, for positioning said members in a predetermined position relative to the conductors;

means, disposed about said electrical insulation members and said centering member, for securing said members in said predetermined position relative to said conductors; and means for fastening said electrical insulation members secured in said predetermined position to said metal casing.

2. The voltage transformer recited in claim 1, wherein said electrical insulation members further comprise mounting bosses for fastening said members to said metal casing.

3. The voltage transformer recited in claim 1, wherein said securing means comprises at least one strap including a threaded sleeve coupled thereto in which an adjustable screw is disposed, said screw being adjustable so as to engage at least one of said electrical insulation members thereby tensioning said strap about said members.

4. The voltage transformer recited in claim 1, wherein said surface electrodes on said electrical insulation members comprise a coating of electrically conductive material.

5. The voltage transformer recited in claim 1, wherein said conductors and said surface electrodes form high potential capacitors the dielectric of which comprises the fluid insulation of said switching apparatus, and wherein said surface electrodes are disposed on an inner peripheral surface of said members adjacent said conductors.

6. The voltage transformer recited in claim 1, wherein said conductors and said surface electrodes form high-potential capacitors the dielectric of which is formed by said electrical insulation members, and wherein said surface electrodes are disposed on an outer peripheral surface of said members away from said conductors.

7. The voltage transformer recited in claim 6, wherein said electrical insulation members each include a constricted area in which said surface electrodes are disposed.

8. The voltage transformer recited in claim 7, further comprising at least one low-potential capacitor disposed externally of said metal casing which forms a capacitive divider in conjunction with at least one high potential capacitor formed by said conductors and said surface electrodes.

9. The voltage transformer recited in claim 8 wherein said low-potential capacitor is disposed in a constricted area of said electrical insulation members.

10. The voltage transformer recited in claim 9, wherein said low potential capacitor comprises a circularly wound capacitor.

11. The voltage transformer recited in claim 7, further comprising at least one current transformer core including a secondary winding system disposed in a constricted area of said electrical insulation members.

12. The voltage transformer recited in claim 9, wherein said constricted area in which said capacitor is disposed is covered with casing resin material.

13. The voltage transformer recited in claim 11, wherein said constricted area in which said current transformer is disposed is covered with casting resin material.

14. The voltage transformer recited in claim 1, wherein said surface electrodes are cylindrical and form a cylindrical capacitor in conjunction with said conductors.

15. The voltage transformer recited in claim 14, further comprising annular ring electrodes disposed adjacent the sides of said cylindrical surface electrodes.

* * * * *